Jan. 20, 1970  E. A. MILLER  3,490,126
COMPOSITE MATERIAL FOR USE IN COOKWARE, HEAT
TRANSFER MATERIALS AND THE LIKE
Filed Jan. 2, 1968  2 Sheets-Sheet 1

INVENTOR
EDWIN A. MILLER

ATT'Y
Edward J. Connors

United States Patent Office 3,490,126
Patented Jan. 20, 1970

3,490,126
COMPOSITE MATERIAL FOR USE IN COOKWARE,
HEAT TRANSFER MATERIALS AND THE LIKE
Edwin A. Miller, Attleboro, Mass., assignor to Texas Instruments Incorporated, Dallas, Tex., a corporation of Delaware
Filed Jan. 2, 1968, Ser. No. 695,246
Int. Cl. B32b 15/20, 15/18, 33/00
U.S. Cl. 29—196.3     3 Claims

ABSTRACT OF THE DISCLOSURE

A composite material has a relatively thin layer of nickel interfacially bonded to a layer of stainless steel, to the other side of which is bonded a layer of heat conductive material. In the annealing operation used in manufacture of the material the nickel can be made to diffuse into the stainless steel to form an attractive white color. The copper layer provides high heat conductivity. Alternatively, a five layered composite material has an inner heat conductive layer sandwiched between two layers of stainless steel lying between relatively thin outer layers of nickel.

---

This invention relates to cookware and heat transfer plates, tubes, vessels and the like. It is an object of this invention to provide a a composite material suitable for such applications which possesses high heat conductivity such that hot spots cannot develop in the material and which is resistant to corrosion and staining, which possesses an attractive appearance and which is easily manufactured. It is known to form materials for cookware from stainless steel since that material has important advantage of freedom from discoloration and staining, since it is easily cleaned and since it is corrosion resistant by many corrosive media. It is also known to form materials for heat exchange application including those required in the chemical process industries from stainless steel because of its resistance to corrosion from many media. A disadvantage of such material is that it is a relatively poor conductor of heat and this is a serious disadvantage when used in high temperature applications since hot spots can develop in the material resulting in overheating of whatever is being heated. In addition, stainless steel can be difficult to form and anneal. Further, it has been proposed to use heat conductive materials such as copper and copper alloys for such applications. However, copper stains easily and in contact with certain foods provides undesirable effects on humans. It has been proposed to use stainless steel/copper combinations. However, stainless steel being relatively difficult to work, requires annealing at high temperatures in atmospheres which are relatively expensive. In addition, some stainless steels are not as attractive aesthetically as other materials.

The instant invention provides a three layer or five layered material which solves these problems and provides a new and advantageous material. It is an object of this invention to provide a material which has high heat conductivity together with good appearance, ease of manufacture and corrosion and stain resistance and which is easily cleaned and to provide cookware and process vessels and the like employing such materials.

Other objects and features will be in part apparent and in part pointed out hereinafter.

The invention accordingly comprises the constructions hereinafter described, the scope of the invention being indicated by the appended claims.

In the accompanying drawings in which some of various possible embodiments of the invention are illustrated:
FIG. 1 is a partly fragmented view showing a cooking utensil employing one form of multilayered material according to the instant invention;

Similar reference characteristics indicate corresponding parts throughout the several views of the drawings. The drawings are illustrative and not to scale since the small thicknesses of the layer involved have been exaggerated and the ratios therebetween have been changed.

Figure 1:
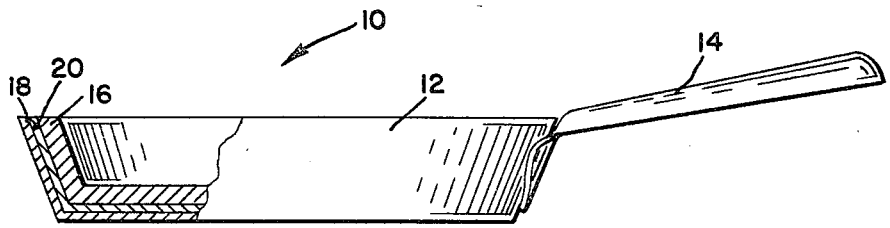

Referring now to the drawings, particularly FIG. 1, there is shown at numeral 10 generally cooking utensil 10 which includes a body portion 12 and a handle 14 attached thereto. Body portion 12 is made of one form of composite material of the instant invention as will be described hereinafter. In the embodiment shown in FIG. 1, body portion 12 is formed of a tri-layer material including, at its inner surface, a thin layer 16 of nickel; at its outside, a layer 18 of heat conductive material; and sandwiching therebetween, a layer of stainless steel 20.

Figure 2:
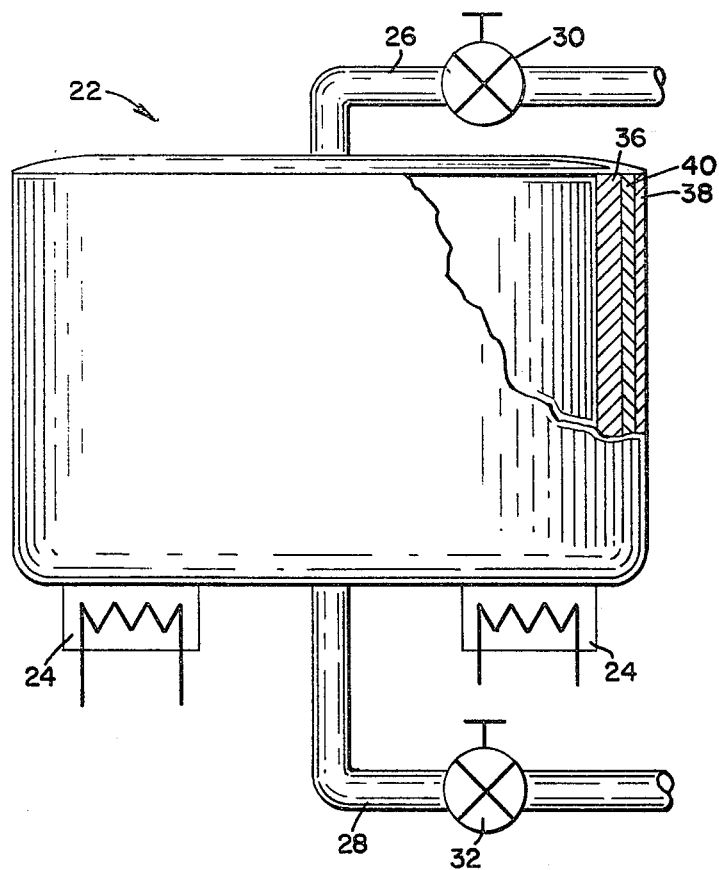
FIG. 2 is a fragmented view showing a vessel employing one form of the multilayer material of the instant invention.

In FIG. 2 there is shown a heat exchange vessel for use in, for example, the chemical process industry and employing a heat exchange material of the instant invention. Process vessel 22 includes heaters 24 and inlet 26 and outlet 28 governed by valves 30 and 32, respectively. The body portion of the vessel 22 is made of, for example, a tri-layered composite, the interior portion of which is nickel 36 and the exterior portion of which is a heat conductor 38 such as copper and sandwiching together a central layer of stainless steel 40.

Layers 18 and 40 are preferably of copper but high conductivity materials such as copper alloys or low carbon steel could also be used, although less preferred.

Figure 3:
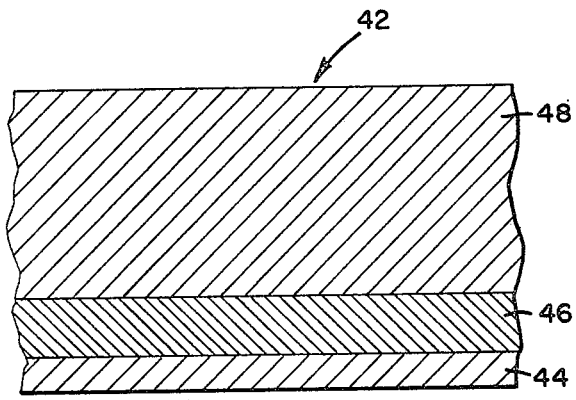
FIG. 3 shows an enlarged cross sectional view of a three layered material made according to the instant invention.

In FIG. 3 there is shown in enlarged cross section, a tri-layered form of the invention which can be employed in heat exchange or cookware applications such as those of FIG. 1 or 2.

The layer of nickel 44 is the surface which forms the interior of the cooking utensil or process vessel and is relatively thin in relation to the other layers and is in the range of 0.0002 and 0.002 inch in thickness with the usual thickness 0.0005 inch. The intermediate layer 46 of stainless steel is relatively thick in relation to the remaining layers may form up to 90% of the total thickness. The layer 48, which provides the heat conductivity is preferably at least 20% of the total but could range up to 80% of the total.

Figure 4:
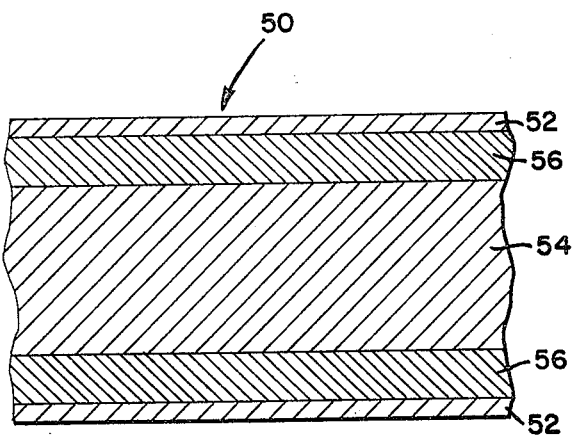
FIG. 4 is an enlarged cross sectional view showing an alternate embodiment of the invention employing a five layered, multilayered material.

Alternatively, as shown in FIG. 4, a five layer composite may be employed as shown generally by reference numerals 50. Strip 50 includes outer layers 52 of nickel and an intermediate layer 54 of a heat conductor such as copper, the heat conductor being sandwiched between layers 56 of stainless steel. The same proportions of thicknesses obtained in the five layered material.

The heat conductive layer employed in either form of the invention is preferably a copper alloy of high thermal conductivity capable of being annealed at high temperature in a reducing atmosphere. The stainless steel is preferably a ferritic stainless steel which provides a high degree of corrosion resistance and yet which is reasonably ductile.

It will be understood that in certain chemical process applications requiring high temperature and high strength alloys such as Hastelloy and the like may be used.

One advantage of the new composite material is that in normal manufacturing processes it is frequently necessary to anneal stainless steel in what is known as a strip annealing process. In this process the material is passed through a spaced or furnace in which the material is heated to the annealing temperature and maintained there for a period of time and is then recoiled. This is an expensive process since not as many units of stainless steel can be annealed per unit of time as in other preferred techniques such as the so-called batch annealing technique in which coils are placed in a large batch furnace and raised to the annealing temperature for a period of time and then taken out. In addition, stainless steel requires a special annealing atmosphere such as a high hydrogen, low dew point atmosphere which is considerably more expensive than other atmospheres.

However, in using the bell annealing process, it is necessary to use a reducing atmosphere at high temperature. The use of the nickel layer means that a high temperature bell annealing process can be used with relatively inexpensive, low hydrogen atmosphere such as cracked city gas or DX atmosphere thereby substantially reducing the cost of manufacture. An additional advantage is that during the annealing process the nickel layer may be diffused into the stainless steel by using maximum temperatures for a longer period of time, producing an attractive white color rather than the usual blue-black color of ferratic stainless steel or the yellowish color of austenitic stainless steel if this is desired. Further, the combination of nickel diffused into the ferritic steel produces a more corrosive resistant and stain resistant surface than the ferritic stainless steel alone. The use of the five layered material provides these features both inside and outside the cookware vessel or process vessel.

It will be understood that this material will be suitable for use in fin material, finned heat exchanging devices, as well as any other heat exchange application where heat conductivity plus corrosion resistance and/or attractive appearance and ease of brazing is required together with low manufacturing cost.

It will thus be seen that the objects of the invention have been achieved and a substantial saving in manufacturing costs over solid stainless steel or stainless steel copper combination has been achieved together with an improved material. A more attractive material is produced together with one which is more corrosive and stain resistant than the solid stainless steel or stainless steel copper combination used heretofore. An additional advantage is that the nickel permits low temperature brazing such as where a handle or other member is required to be brazed to the vessel or heat exchange unit. Further, the use of nickel permits the use of the more ductile forms, less expensive forms of stainless steel.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A composite material for use in cookware, heat-transfer vessels and the like comprising a layer of stainless steel interfacially bonded to one side of a layer of copper, said stainless steel layer having an exposed surface layer thereof relatively richer in nickel than the remainder of said stainless steel layer for providing said surface with a metallic white color and for permitting brazing to said surface without significant discoloration of said surface.

2. A composite material as set forth in claim 1 wherein said stainless steel layer embodies ferritic stainless steel.

3. A composite material as set forth in claim 1 wherein an additional layer of stainless steel is interfacially bonded to an opposite side of said layer of copper, said additional stainless steel layer having an exposed surface layer thereof relatively richer in nickel than the remainder of said stainless steel layer for providing said surface with a metallic white color and for permitting brazing to said surface of said additional layer without significant discoloration of said additional layer.

References Cited

UNITED STATES PATENTS

| 2,471,663 | 5/1949 | Tietz | 220—63 |
| 2,841,137 | 7/1958 | Chace | 220—63 |

HYLAND BIZOT, Primary Examiner

U.S. Cl. X.R.

29—196.6